(12) United States Patent
Huang

(10) Patent No.: US 9,106,084 B2
(45) Date of Patent: Aug. 11, 2015

(54) ELECTRICAL CHARGER FOR CHARGING ELECTRONIC DEVICE

(71) Applicant: HON HAI PRECISION INDUSTRY CO., LTD., New Taipei (TW)

(72) Inventor: Ying-Jui Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 168 days.

(21) Appl. No.: 13/973,971

(22) Filed: Aug. 22, 2013

(65) Prior Publication Data

US 2014/0320066 A1    Oct. 30, 2014

(30) Foreign Application Priority Data

Apr. 26, 2013    (TW) .............................. 102114921 U

(51) Int. Cl.
  *H02J 7/00*    (2006.01)

(52) U.S. Cl.
  CPC ............... *H02J 7/0042* (2013.01); *Y02B 40/90* (2013.01)

(58) Field of Classification Search
  CPC ...... H02J 7/0042; H02J 7/0044; H02J 7/0045
  USPC .......................................... 320/107, 110–115
  See application file for complete search history.

(56) References Cited

U.S. PATENT DOCUMENTS

2006/0192525 A1*    8/2006    Qin et al. ...................... 320/107

* cited by examiner

*Primary Examiner* — Paul Dinh
(74) *Attorney, Agent, or Firm* — Novak Druce Connolly Bove + Quigg LLP

(57) ABSTRACT

A charger for charging an electronic device includes a main body, a latching mechanism, and a number of connecting pins. The main body defines a receiving groove for receiving a part of the electronic device. An opening is defined in a bottom wall of the receiving groove. A receiving slot is defined in one of two opposite major sidewalls of the receiving groove. The latching mechanism is pivotally connected to the main body. The latching mechanism includes an abutting portion received in the opening, and a fastening portion extending upwardly from the abutting portion. A post protrudes from a top face of the abutting portion. The connecting pins are disposed at the fastening portion. The electronic device includes a number of connecting pins for electrically contacting the connecting pins of the charger, and an external protrusion for abutting against the post of the charger.

20 Claims, 6 Drawing Sheets

ELECTRICAL CHARGER FOR CHARGING ELECTRONIC DEVICE

BACKGROUND

1. Technical Field

The disclosure relates to electrical chargers and, more particularly, to an electrical charger typically used for charging a mobile electronic device.

2. Description of Related Art

Nowadays, numerous types of chargers are used to charge a variety of mobile electronic devices (such as cellular phones, tablet computers, etc). One kind of charger includes a shell with a cavity. A part of the mobile electronic device is inserted into the cavity of the shell in order to charge the mobile electronic device. A latching mechanism is fastened at a bottom of the cavity of the shell. Connecting pins of the latching mechanism extend into an inside of the mobile electronic device, to electrically contact a charging circuit in the mobile electronic device and thereby charge the mobile electronic device. However, if a user inserts the mobile electronic device into the cavity of the shell in a wrong orientation, the mobile electronic device is liable to easily crush the connecting pins at the bottom of the cavity, and the connecting pins are liable to scratch an outer surface of the mobile electronic device simultaneously.

What is needed, therefore, is a charger which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
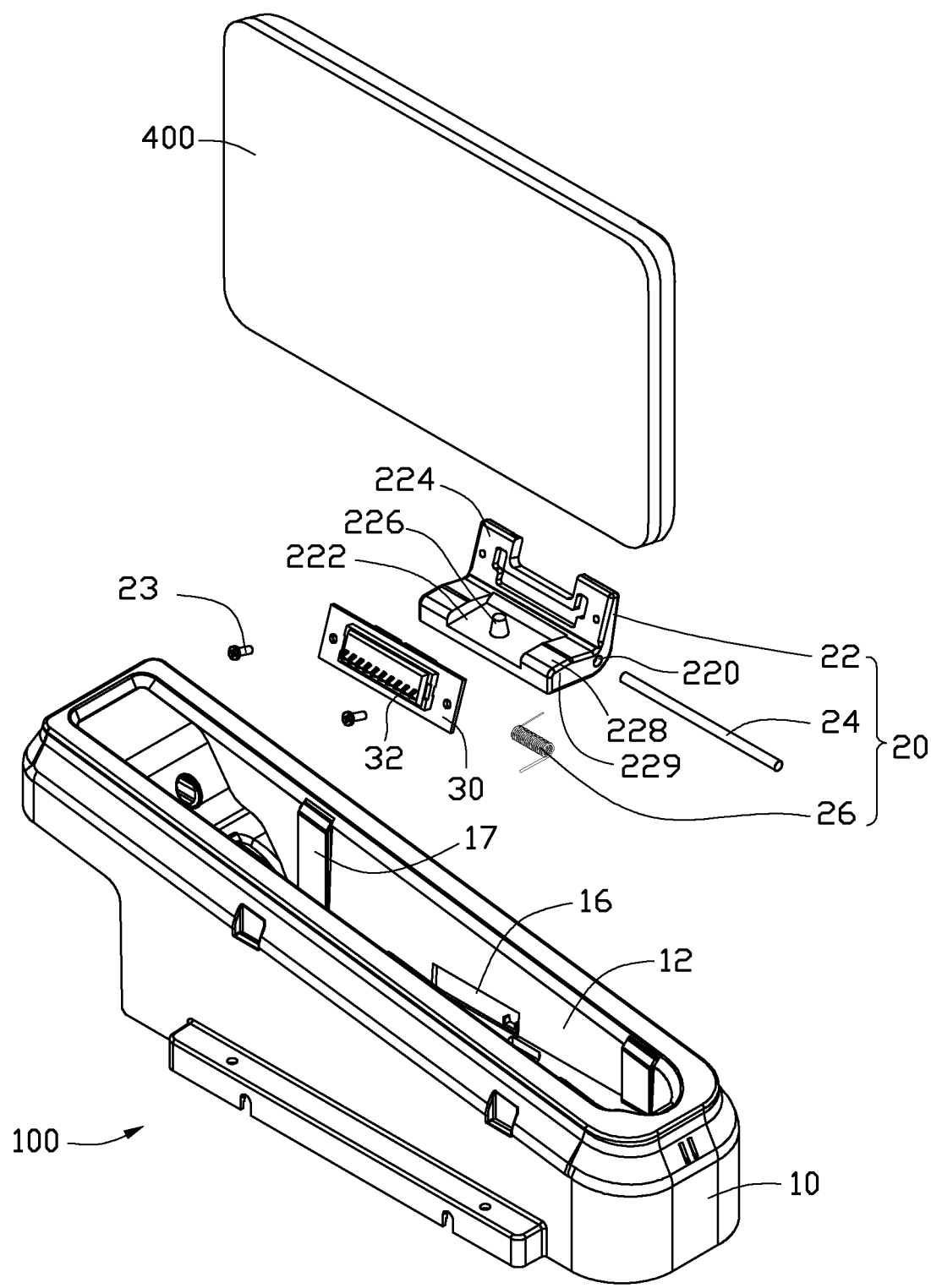
FIG. 1 is an isometric, exploded view of a charger in accordance with one embodiment of the disclosure, together with an electronic device.
Figure 2:
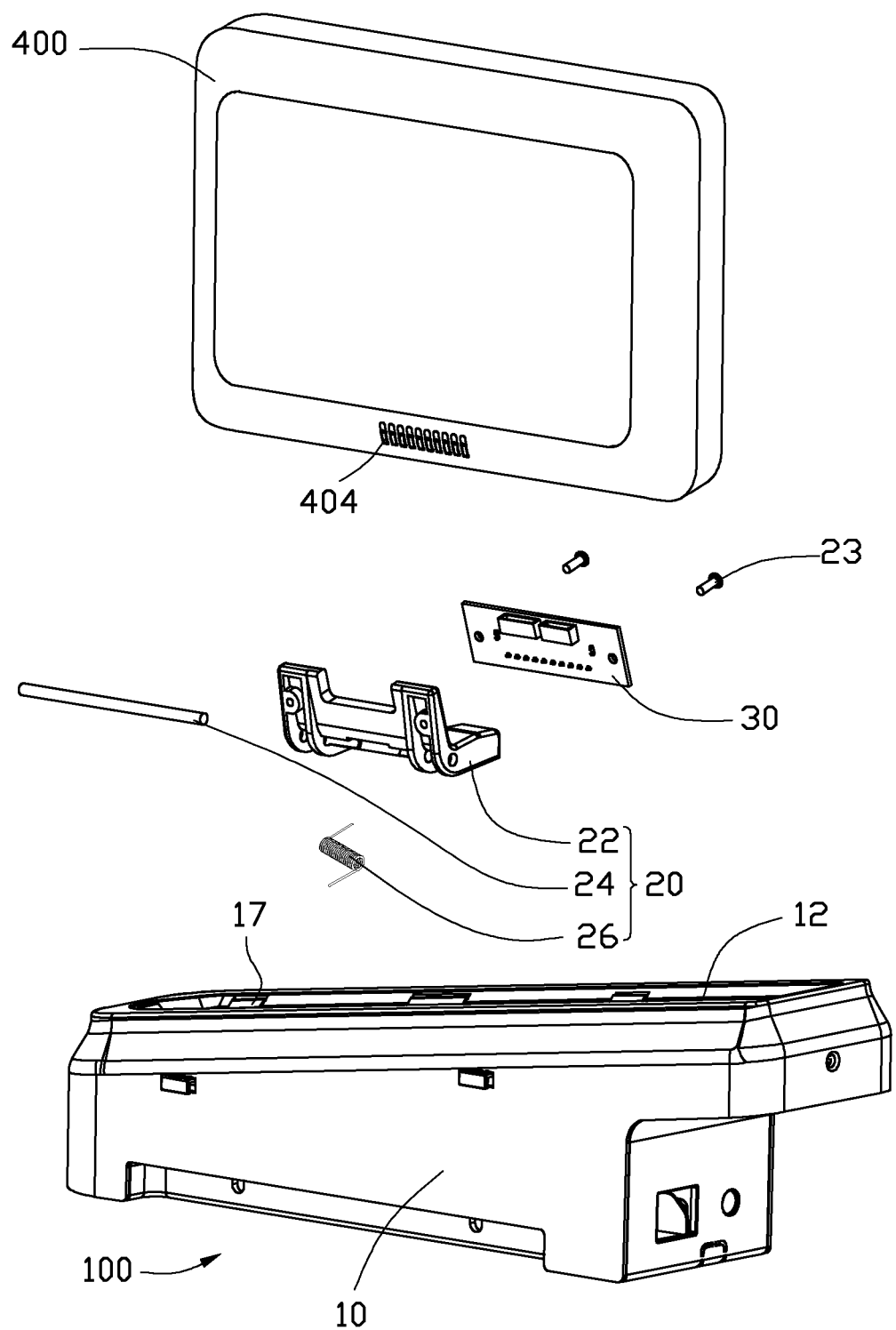
FIG. 2 is similar to FIG. 1, but showing the charger and the electronic device seen from another viewpoint.
Figure 5:
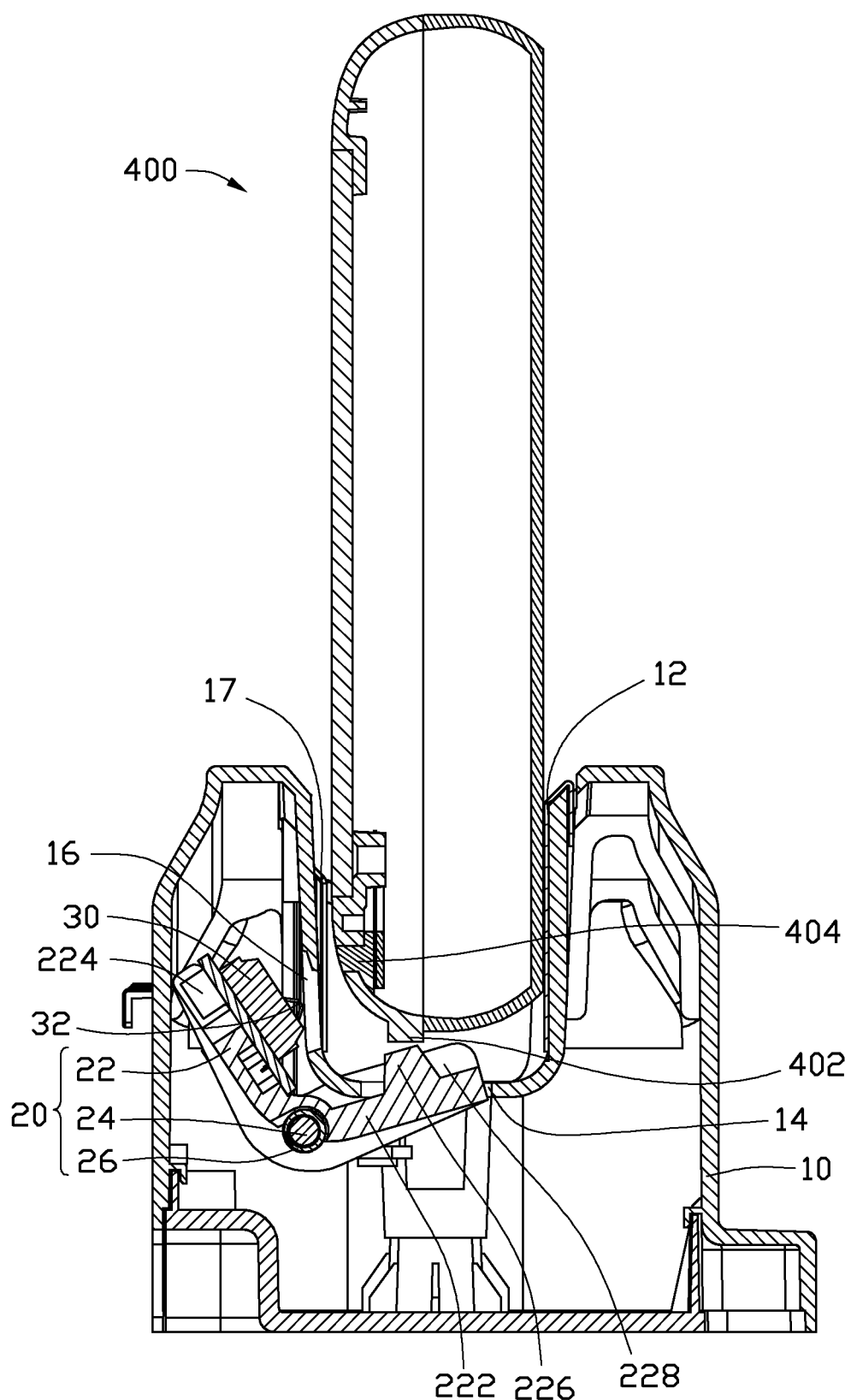
FIG. 5 is a cross-sectional view of the charger and the electronic device of FIG. 1 when the charger is assembled and the electronic device is inserted in the charger, and showing the charger in a non-charging state.

Referring to FIGS. 1-2 and 5, a charger 100 in accordance with an embodiment of the disclosure is shown. The charger 100 is used for charging an electronic device 400, and includes a main body 10, a latching mechanism 20 mounted on the main body 10, and a connector sheet 30 fixed on the latching mechanism 20. When the charger 100 is energized, the connector sheet 30 electrically connects a power source (not shown). A protrusion 402 extends from a bottom of the electronic device 400, and one or more connectors 404 for charging the electronic device 400 are formed at a side face of the electronic device 400. In the present embodiment, the one or more connectors 404 are a plurality of connecting pins 404.

Figure 3:
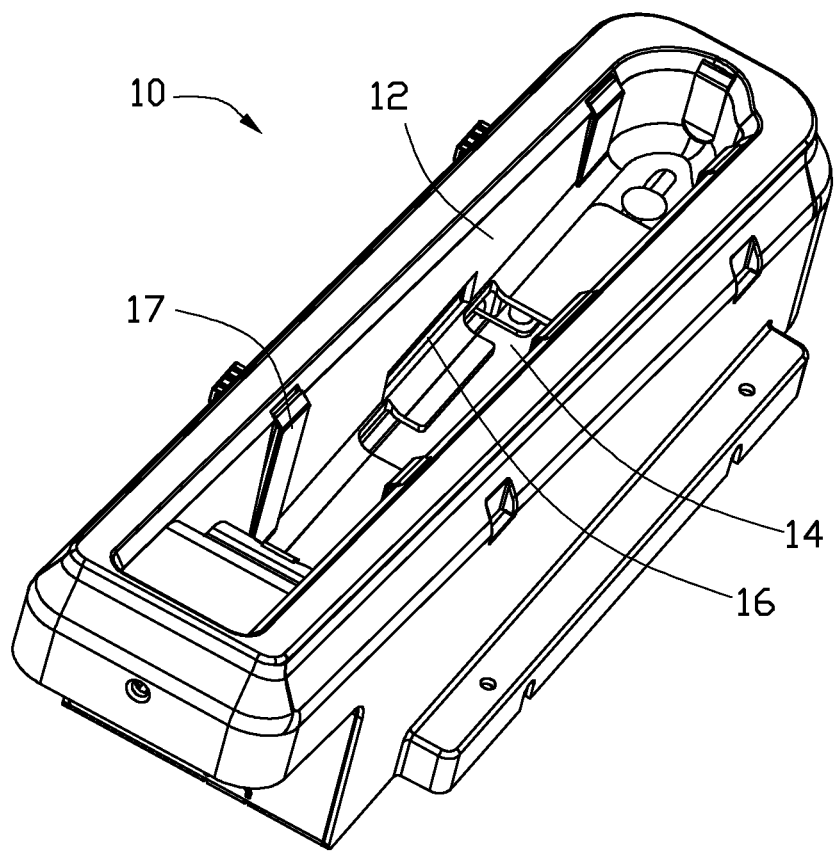
FIG. 3 is an isometric view of a main body of the charger of FIG. 1.

Referring also to FIG. 3, the main body 10 defines a receiving groove 12 for receiving a part of the electronic device 400. An opening 14 is defined in a bottom wall of the receiving groove 12. A receiving slot 16 is defined in one of two opposite major sidewalls of the receiving groove 12, corresponding to the connecting pins 404 of the electronic device 400. A plurality of spaced, vertical supporting strips 17 are provided on the major sidewalls and one end wall of the receiving groove 12, for elastically abutting corresponding faces of the electronic device 400. The material of the supporting strips 17 can for example be plastic or metal.

A plurality of connecting pins 32 are disposed at a major side of the connector sheet 30. The connecting pins 32 can extend through the receiving slot 16 to electrically contact the connecting pins 404 of the electronic device 400 and thereby charge the electronic device 400.

The latching mechanism 20 includes a connecting bracket 22, a pivot 24, and a resilient member 26.

The connecting bracket 22 includes an abutting portion 222 received in the opening 14, and a fastening portion 224 extending upwardly from the abutting portion 222. A post 226 and two steps 228 protrude from a top face of the abutting portion 222. The two steps 228 are located at two opposite sides of the post 226. If the electronic device 400 is inadvertently inserted into the receiving groove 12 of the charger 100 in a slantwise orientation and slid along a length direction of the receiving groove 12, a lateral side face 229 of either step 228 can block the electronic device 400. A height of the post 226 is larger than that of each of the steps 228, so that when the electronic device 400 is vertically and downwardly inserted into the receiving groove 12 in a correct orientation, the electronic device 400 can only abut against the post 226 and can not contact the steps 228. The connector sheet 30 is fastened on the fastening portion 224 via fasteners 23 (such as screws), so that the connecting pins 32 of the connector sheet 30 face generally toward the abutting portion 222 and are located above the abutting portion 222. The abutting portion 222 is approximately perpendicular to the fastening portion 224. In the illustrated embodiment, an angle between the abutting portion 222 and the fastening portion 224 is slightly more than 90°. A pivot hole 220 is defined in the connecting bracket 22 at a position where the abutting portion 222 and the fastening portion 224 intersect.

Figure 4:
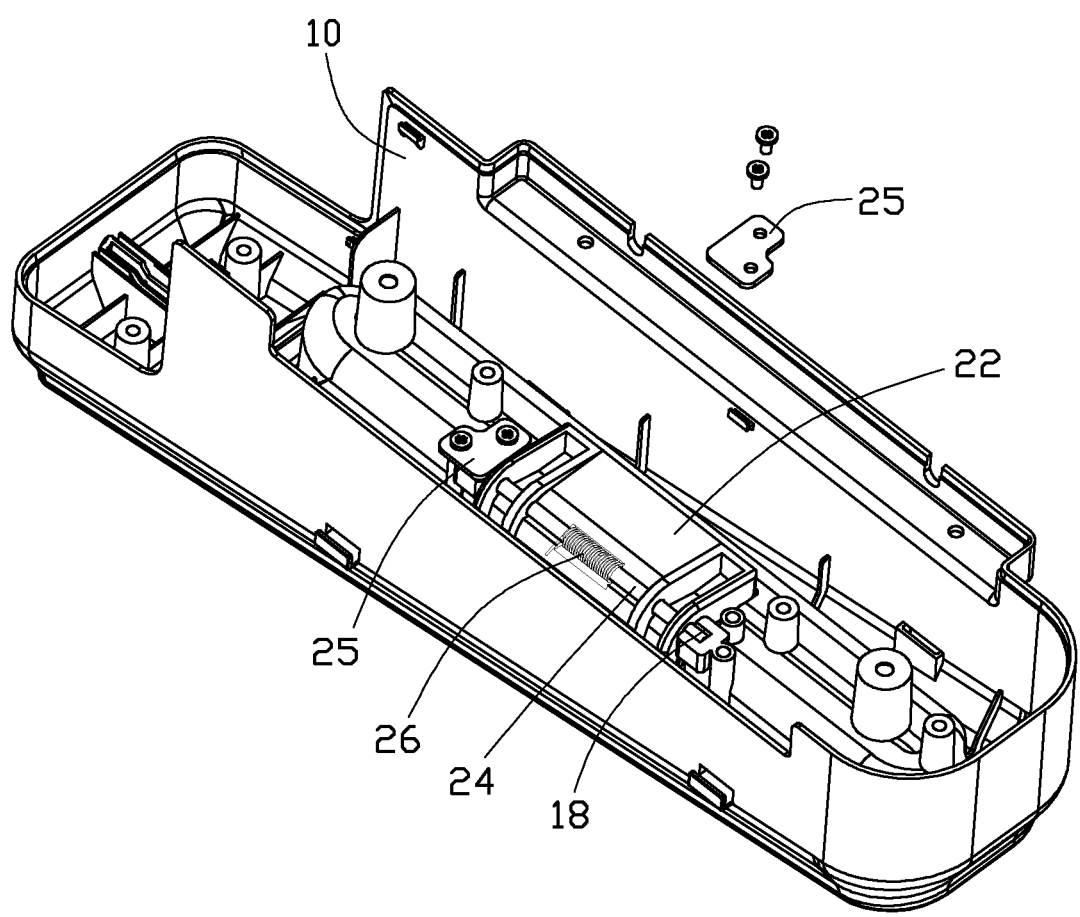
FIG. 4 is essentially an inverted, assembled view of the charger of FIG. 1.

Referring also to FIG. 4, the pivot 24 is received through the pivot hole 220, with two ends of the pivot 24 protruding out from the pivot hole 220 at two ends of the connecting bracket 22. The main body 10 defines two concave slots 18 in an underside of the bottom wall of the receiving groove 12, corresponding to the two ends of the pivot 24. The two ends of the pivot 24 are fixed in the two concave slots 18 of the main body 10 via two fixing sheets 25, so that the connecting bracket 22 is pivotally connected with the main body 10.

In this embodiment, the resilient member 26 is a torsion spring. The resilient member 26 is sleeved on the pivot 24. Two ends of the resilient member 26 resiliently abut the connecting bracket 22 and the main body 10, respectively. When the charger 100 is at a non-charging state, the abutting portion 222 of the connecting bracket 22 is raised upwardly under a resilient force exerted by the resilient member 26. In such position, the post 226 and the two steps 228 of the abutting portion 222 protrude up beyond a top face of the bottom wall of the receiving groove 12, and the connecting pins 32 of the connector sheet 30 are opposite to but do not extend into or through the receiving slot 16.

Figure 6:
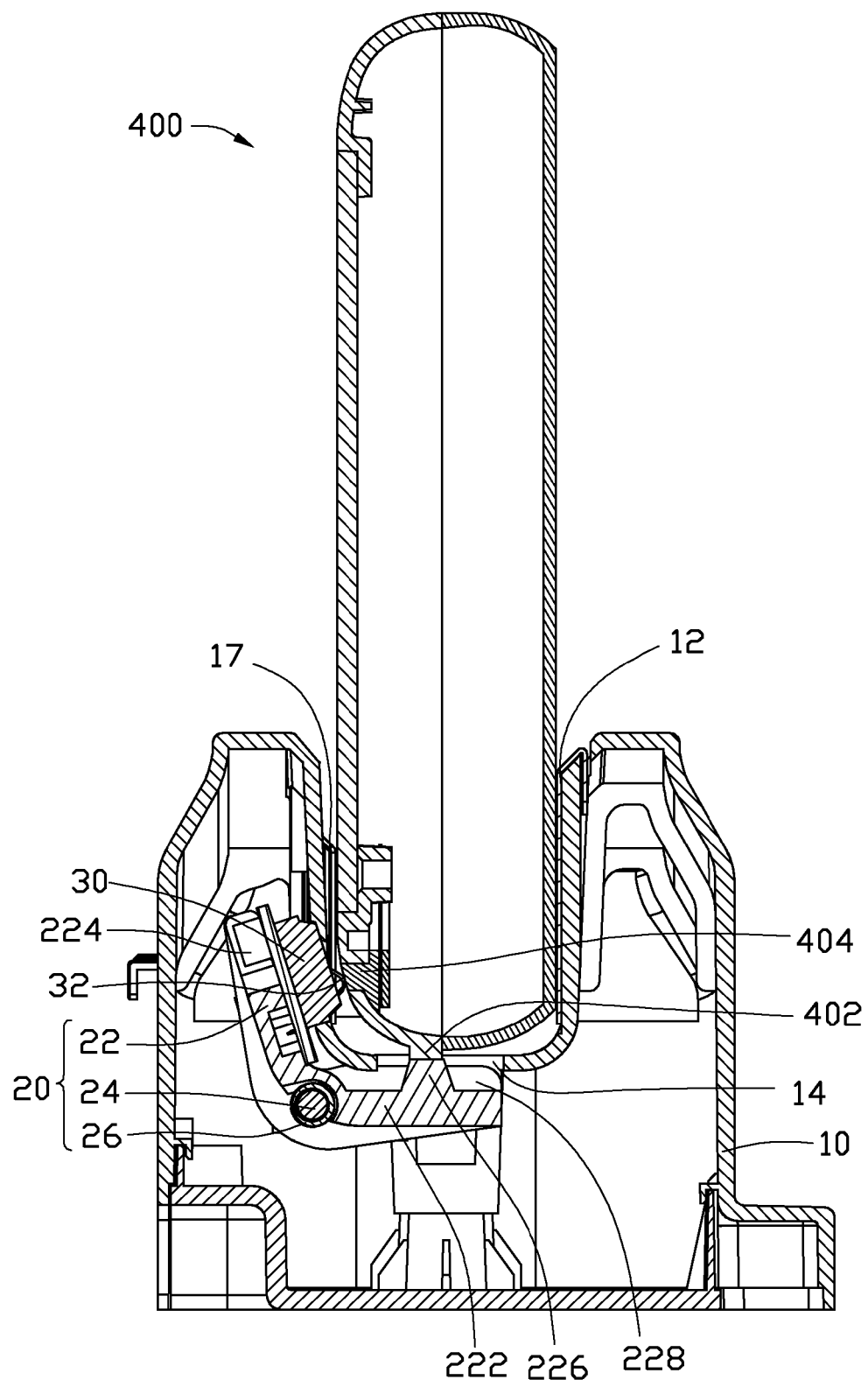
FIG. 6 is similar to FIG. 5, but showing the charger in a charging state.

Also referring to FIGS. 5-6, when the electronic device 400 is to be charged, the side of the electronic device 400 having the protrusion 402 is inserted into the receiving groove 12 of the charger 100 in an orientation whereby the connecting pins 404 will correspond with the connector sheet 30. The protrusion 402 of the electronic device 400 abuts against the post 226 of the connecting bracket 22 to make the connecting bracket 22 rotate, whereby the post 226 of the connecting bracket 22 moves downwardly to a position slightly lower than the top face of the bottom wall of the receiving groove 12. Simultaneously, the connecting pins 32 extend inward through the receiving slot 16 to electrically contact the connecting pins 404 of the electronic device 400.

When the side of the electronic device 400 without the protrusion 402 formed thereat is inadvertently inserted into the receiving groove 12 of the charger 100, or when the side of the electronic device 400 having the protrusion 402 is inadvertently inserted into the receiving groove 12 of the charger 100 in a wrong orientation, in each case, the inserted side of the electronic device 400 presses the post 226 of the connecting bracket 22 to make the post 226 of the connecting bracket 22 move downwardly somewhat. However, the post 226 of the connecting bracket 22 can not reach the position which is lower than the top face of the bottom wall of the receiving groove 12. Correspondingly, even though the connecting pins 32 are moved inward somewhat, the connecting pins 32 can not extend through the receiving slot 16 to an extent where the connecting pins 32 would contact the inserted side of the electronic device 400.

According to the charger 100 of the present disclosure, only the side of the electronic device 400 with the protrusion 402 formed thereat can abut against the post 226 of the latching mechanism 20 to make the latching mechanism 20 rotate, and this can only happen when the side of the electronic device 400 with the protrusion 402 formed thereat is inserted into the receiving groove 12 of the charger 100 in the correct orientation. When the electronic device 400 is correctly inserted and the latching mechanism 20 rotates, the connecting pins 32 extend through the receiving slot 16 to electrically contact the connecting pins 404 of the electronic device 400 and thereby charge the electronic device 400. This configuration of the charger 100 prevents the electronic device 400 from crushing the connecting pins 32 of the charger 100 and/or simultaneously the connecting pins 32 scratching the outer surface of the electronic device 400 in the event that the electronic device 400 is wrongly inserted into the receiving groove 12.

It is believed that the embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments.

What is claimed is:

1. A charger for charging an electronic device, the electronic device comprising a plurality of connecting pins for charging the electronic device, and an external protrusion, the charger comprising:
   a main body defining a receiving groove for receiving a part of the electronic device, an opening being defined in a bottom wall of the receiving groove, a receiving slot being defined in one of two opposite major sidewalls of the receiving groove; and
   a latching mechanism pivotally connected with the main body, the latching mechanism comprising an abutting portion received through the opening and a fastening portion extending upwardly from the abutting portion, a post protruding from a top face of the abutting portion; and
   a plurality of connecting pins being disposed at the fastening portion;
   wherein when the charger is at a non-charging state, the post of the abutting portion protrudes up beyond a top face of the bottom wall of the receiving groove, and the connecting pins are opposite to but do not extend into the receiving slot;
   wherein at the non-charging state the post is positioned such that the post is pushable down to a position corresponding to a charging state of the charger by the protrusion only when the electronic device is inserted into the receiving groove in a correct orientation; and
   wherein when the electronic device is inserted into the receiving groove in the correct orientation, the protrusion abuts against the post to make the latching mechanism rotate to a position corresponding to the charging state of the charger, and the connecting pins of the charger extend through the receiving slot and electrically contact the connecting pins of the electronic device.

2. The charger of claim 1, wherein two steps protrude from the top face of the abutting portion, and are located at two opposite sides of the post.

3. The charger of claim 2, wherein when the charger is at the non-charging state, the steps of the abutting portion protrude up beyond the top face of the bottom wall of the receiving groove.

4. The charger of claim 3, wherein a height of the post is larger than that of each of the steps.

5. The charger of claim 1, wherein the latching mechanism further comprises a pivot, and a pivot hole defined at a position where the abutting portion and the fastening portion intersect, the pivot being received through the pivot hole, with two ends of the pivot protruding out from the pivot hole.

6. The charger of claim 5, wherein the main body defines two concave slots in an underside of the bottom wall of the receiving groove, the two ends of the pivot being fixed in the two concave slots of the main body by two fixing sheets.

7. The charger of claim 5, wherein the abutting portion is approximately perpendicular to the fastening portion.

8. The charger of claim 5, wherein the latching mechanism further comprises a resilient member sleeved on the pivot, and two ends of the resilient member resiliently abut the latching mechanism and the main body, respectively.

9. The charger of claim 8, wherein the resilient member is a spring.

10. The charger of claim 8, wherein when the charger is at the non-charging state, the abutting portion is raised upwardly under a resilient force exerted by the resilient member, so that the post on the abutting portion protrudes up beyond the top face of the bottom wall of the receiving groove.

11. The charger of claim 3, wherein the latching mechanism further comprises a pivot, and a pivot hole defined at a position where the abutting portion and the fastening portion intersect, the pivot being received through the pivot hole, with two ends of the pivot protruding out from the pivot hole.

12. The charger of claim 11, wherein the latching mechanism further comprises a resilient member sleeved on the pivot, and two ends of the resilient member resiliently abut the latching mechanism and the main body, respectively.

13. The charger of claim 12, wherein when the charger is at the non-charging state, the abutting portion is raised upwardly under a resilient force exerted by the resilient member, so that the post and the two steps on the abutting portion protrude up beyond the top face of the bottom wall of the receiving groove.

14. The charger of claim 1, wherein a plurality of spaced, vertical supporting strips are provided on the major sidewalls and one end wall of the receiving groove, for elastically abutting corresponding faces of the electronic device.

15. The charger of claim 14, wherein the material of each of the supporting strips is selected from the group consisting of plastic and metal.

16. The charger of claim 1, further comprising a connector sheet, wherein the plurality of connecting pins are disposed at a major side of the connector sheet, and the connector sheet is fastened on the fastening portion by one or more fasteners, so that the connecting pins face generally toward the abutting portion.

17. The charger of claim 1, wherein when the electronic device is inserted into the receiving groove in an incorrect orientation, a portion of the electronic device other than the protrusion abuts against the post to make the latching mechanism rotate only to a position short of the position corresponding to the charging state of the charger.

18. A charger for charging an electronic device, the electronic device comprising a connector for charging the electronic device, and an external protrusion, the charger comprising:
   a main body defining a receiving groove for receiving a side of the electronic device, an opening being defined in a bottom wall of the receiving groove, a receiving slot being defined in a long sidewall of the receiving groove;
   a latching mechanism pivotally connected with the main body, the latching mechanism comprising an abutting portion received in the opening and a fastening portion extending upwardly from the abutting portion, a post protruding from a top of the abutting portion; and
   a plurality of connecting pins being disposed on the fastening portion;
   wherein when the charger is in a non-charging state, the post of the abutting portion protrudes up beyond a top face of the bottom wall of the receiving groove, and the connecting pins are located outside the receiving slot;
   wherein in the non-charging state the post is positioned such that the post is pushable down to a position corresponding to a charging state of the charger by the protrusion only when the electronic device is inserted into the receiving groove in a single correct orientation; and
   wherein when the electronic device is inserted into the receiving groove in the correct orientation, the protrusion drives the post down to make the latching mechanism rotate to a position corresponding to the charging state of the charger, and the connecting pins extend through the receiving slot and electrically contact the connector of the electronic device.

19. The charger of claim 18, wherein when the electronic device is inserted into the receiving groove in an incorrect orientation, the protrusion does not contact the post, and the electronic device abuts against the post to make the latching mechanism rotate only to a position short of the position corresponding to the charging state of the charger.

20. A charger for charging an electronic device, the electronic device comprising a connector for charging the electronic device, and an external protrusion, the charger comprising:
   a main body defining a receiving groove for receiving a side of the electronic device, an opening being defined in a bottom wall of the receiving groove, a receiving slot being defined in a long sidewall of the receiving groove;
   a latching mechanism pivotally connected with the main body, the latching mechanism comprising an abutting portion received in the opening and a fastening portion extending upwardly from the abutting portion, a post protruding from a top of the abutting portion; and
   a plurality of connecting pins being disposed on the fastening portion;
   wherein when the charger is in a non-charging state, the post of the abutting portion protrudes up beyond a top face of the bottom wall of the receiving groove, and the connecting pins are located outside the receiving slot;
   wherein in the non-charging state the post is positioned such that the post is pushable by the protrusion down to a position in which a top end of the post is lower than the top face of the bottom wall of the receiving groove only when the electronic device is inserted into the receiving groove in a single correct orientation; and
   wherein when the electronic device is inserted into the receiving groove in the correct orientation, the protrusion pushes the post down to make the latching mechanism rotate, whereby the post moves downwardly to the position in which the top end of the post is lower than the top face of the bottom wall of the receiving groove, and the connecting pins extend through the receiving slot and electrically contact the connector of the electronic device.

* * * * *